(12) United States Patent
Nakata

(10) Patent No.: US 6,913,705 B2
(45) Date of Patent: Jul. 5, 2005

(54) MANUFACTURING METHOD FOR OPTICAL INTEGRATED CIRCUIT HAVING SPATIAL REFLECTION TYPE STRUCTURE

(75) Inventor: Hidehiko Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 447 days.

(21) Appl. No.: 10/271,552

(22) Filed: Oct. 17, 2002

(65) Prior Publication Data

US 2003/0155327 A1 Aug. 21, 2003

(30) Foreign Application Priority Data

Feb. 21, 2002 (JP) ........................................ 2002-044579

(51) Int. Cl.$^7$ ............................................. H01L 21/00
(52) U.S. Cl. ................... 216/24; 41/47; 41/48; 41/49; 41/55; 41/67; 430/321; 430/323; 430/325; 430/330; 438/31; 438/40; 438/43; 438/713; 438/978
(58) Field of Search ................... 216/24, 41, 47–49, 216/55, 67; 430/321–330; 438/29, 31, 32, 39–40, 42–43, 700–701, 713, 760, 781, 978, 948–949

(56) References Cited

U.S. PATENT DOCUMENTS

| | | | | |
|---|---|---|---|---|
| 4,935,334 A | * | 6/1990 | Boettiger et al. | ........... 430/322 |
| 5,786,925 A | | 7/1998 | Goossen et al. | ........... 359/245 |
| 5,804,474 A | * | 9/1998 | Sakaki et al. | ............... 438/167 |
| 6,163,353 A | * | 12/2000 | Ting | ........................... 349/113 |
| 6,781,759 B1 | * | 8/2004 | Wakita et al. | ............... 359/599 |

FOREIGN PATENT DOCUMENTS

| | | | | |
|---|---|---|---|---|
| JP | 63031119 A | * | 2/1988 | ........... H01L/21/30 |
| JP | 05029283 A | * | 2/1993 | ......... H01L/21/302 |
| JP | 06265738 A | * | 9/1994 | ............ G02B/6/12 |
| JP | 07-176717 | | 7/1995 | |
| JP | 09197179 A | * | 7/1997 | ............ G02B/6/30 |
| JP | 2000-047044 | | 2/2000 | |
| JP | 2000047044 A | * | 2/2000 | ........... G02B/6/122 |

* cited by examiner

Primary Examiner—Anita Alanko
(74) Attorney, Agent, or Firm—Staas & Halsey LLP

(57) ABSTRACT

A manufacturing method for an optical integrated circuit including a spatial reflection type structure having a perpendicular end surface and an inclined surface formed in an optical waveguide layer. The manufacturing method includes the steps of applying a first photoresist to the upper surface of the optical waveguide layer, removing the first photoresist except a portion corresponding to the inclined surface, and heating the first preferred embodiment to a given temperature to melt the first photoresist at least partially and deform the first photoresist by surface tension, thereby forming a first mask having an inclined shape. The manufacturing method further includes the steps of applying a second photoresist to the upper surfaces of the optical waveguide layer and the first mask, removing the second photoresist at a portion ranging from a position corresponding to the perpendicular end surface to a position corresponding to the upper end of the inclined surface to form a second mask, and etching the first mask, the second mask, and the optical waveguide layer by RIE to thereby simultaneously form the perpendicular end surface and the inclined surface.

9 Claims, 6 Drawing Sheets

MANUFACTURING METHOD FOR OPTICAL INTEGRATED CIRCUIT HAVING SPATIAL REFLECTION TYPE STRUCTURE

BACKGROUND OF THE INVENTION

1. Field of the Invention

The present invention relates to a manufacturing method for an optical integrated circuit for use in optical communication or the like, and more particularly to a manufacturing method for an optical integrated circuit realizing the optical coupling between an optical waveguide and an optical active element by a spatial reflection type structure.

2. Description of the Related Art

With the recent explosive expansion of communication demands, developments on communication networks for higher-speed communication using an optical fiber and for higher-capacity communication using wavelength division multiplexing (WDM) are being pursued at a worldwide level. Many of optical functional elements required for repeating, switching, etc. in such WDM optical communication are configured as bulk components or the like, and a higher level of optical path length adjustment or the like is required with an increase in operating speed of an optical communication system. Accordingly, the components become expensive in many cases, causing a great increase in cost of the optical communication system.

In such a background, a planar lightwave circuit (PLC) type functional integrated element allowing finer optical path length design and mass production using a full process is expected as a promising device for realization of high functionality, size reduction, and cost reduction, and active research on such a device is being pursued globally at present. Further, it has become greatly important to develop a structure and its manufacturing technique allowing the control of such a PLC type WDM device and the coupling between the WDM device and an optical active element required for extraction of an optical signal from the WDM device or launching of an optical signal into the WDM device, with ease at a high density and a low cost.

As a coupling structure between the optical waveguide in the PLC type device and the optical active element, various simple optical mounting structures using a mirror having a surface inclined about 45° with respect to the optical waveguide have been proposed. There will now be described in detail various forming methods for such an inclined mirror used for the coupling between the optical waveguide and the optical active element. A forming method by a hybrid inclined mirror structure (which will be hereinafter referred to as a conventional forming method A) is known, wherein an inclined mirror is fabricated as a separate component by using anisotropic etching of Si crystal or the like, and this inclined mirror component is hybrid-integrated with the optical waveguide. This conventional forming method A is a method having been generally used until other methods to be hereinafter described are proposed.

A forming method by inclined dicing (which will be hereinafter referred to as a conventional forming method B) is known, wherein a wafer is diced in its inclined condition by using a dicing blade having a V-shaped cutting edge with respect to a substrate having an optical waveguide to form an inclined surface as one of the opposed diced faces of the wafer and a perpendicular end surface as the other diced face of the wafer. This conventional forming method B is an easiest process and has a merit in the case that the kind of products is limited.

A forming method by laser beam machining (which will be hereinafter referred to as a conventional forming method C) is known from U.S. Pat. No. 5,894,538, for example, wherein a laser beam is directed to an optical waveguide in a direction inclined 45° with respect to the optical waveguide, thereby vaporizing $SiO_2$, or the amount of vaporization of $SiO_2$ is controlled with the irradiation time by laser sweeping to perform 45° etching to the optical waveguide. This conventional forming method C does not require mask formation on a wafer and can change a forming position of the inclined surface according to wafers, so that this method has a merit in the case of flexible production such that the kind of products is various and the volume of products is low.

A forming method by different-rate wet etching (which will be hereinafter referred to as a conventional forming method D) is known from U.S. Pat. No. 5,135,605 and Japanese Patent Laid-open No. Hei 11-326662, for example, wherein a material having an etching rate higher than the material of an optical waveguide is deposited by evaporation on an inclined surface forming region of the optical waveguide, and an etching mask is formed over the optical waveguide to perform wet etching. In this conventional forming method D, the underetch under the etching mask proceeds faster in the region where the above high-etch-rate material is deposited than in the other region, so that asymmetrical inclined surface formation (e.g., formation of a perpendicular end surface and an incline surface) is allowed. The conventional forming method D is a full process per wafer, and it therefore has a merit in the case of mass production such that the kind of products is few and the volume of products is high.

A forming method by inclined RIE (Reactive Ion Etching) (which will be hereinafter referred to as a conventional forming method E) is known from Japanese Patent Laid-open Nos. 2000-199827 and 2000-235128, for example, wherein patterning is performed by using a thin mask film such as a metal mask, and a substrate to be etched is inclined about 45° (a desired angle of an inclined surface) with respect to an RIE electrode to perform RIE. This conventional forming method E adopts RIE, and it therefore has a merit from the viewpoint of smoothness of the inclined surface.

A forming method by a gray mask and RIE (which will be hereinafter referred to as a conventional forming method F) is known from U.S. Pat. No. 5,310,623 and Japanese Patent Laid-open No. Hei 6-265738, for example, wherein a gray-scale mask such that the exposure intensity is approximated by an opening area of a subpixel size is used to form a master pattern of an inclined surface on a photosensitive mask material by one operation of exposure and development, and the master pattern of the inclined surface is next transferred by RIE. In this conventional forming method F, the mask surface of the photosensitive mask material is heated during the RIE to cause a deterioration in mask shape in an RIE apparatus. Therefore, in the process of transferring the master pattern formed of the photosensitive mask material by the RIE, the mask material after exposure and development must be heated to a temperature higher than the heating temperature in the RIE apparatus for the purpose of curing, thereby preventing softening of the mask material during the RIE to prevent thermal deformation of the mask shape upon reheating.

In the conventional forming method F, the master pattern of a three-dimensional shape (e.g., inclined surface) formed of a photoresist for use in the transfer process by RIE is formed in one operation of exposure using a single exposure mask by approximating the three-dimensional shape according to the average of exposure intensities at a subpixel size forming a gray scale. Accordingly, as compared with the case of forming a three-dimensional mater pattern by multistep exposure using a plurality of exposure masks, this method F has a merit from the viewpoint of prevention of deterioration in shape of the master pattern due to misregistration of the exposure masks.

The coupling structure using the inclined mirror between the optical waveguide in the PLC type device and the optical active element may be generally classified into two structures shown in FIGS. 1 and 2. The structure shown in FIG. 1 is of a waveguide end surface reflection type, which is known from U.S. Pat. No. 5,966,478, for example, wherein an end surface of an optical waveguide is inclined about 45° with respect to the optical waveguide, and light propagating along the optical waveguide is totally reflected on the inclined end surface of the optical waveguide. To effect the total reflection on the inclined end surface of the optical waveguide, a material having a refractive index lower than that of the optical waveguide must be applied near the inclined end surface, or a metal film must be formed on the inclined end surface.

On the other hand, the structure shown in FIG. 2 is of a spatial reflection type such that light emerged from an end surface of an optical waveguide is totally reflected on an inclined surface inclined about 45° with respect to the optical waveguide and opposed to the end surface of the optical waveguide. In selecting the structures shown in FIGS. 1 and 2, it is necessary to consider a sealing structure for the optical active element. That is, the optical active element to be mounted on an optical integrated circuit must have a sealing structure for protection from moisture or the like. Conventionally, the optical active element is hermetically packaged and the optical coupling between the optical active element and an external element (e.g., optical fiber) is effected by utilizing a lens or the like through a glass window. Similarly, it may be considered to protect the whole of the optical integrated circuit on which the optical active element is mounted by using a hermetic package.

Basically, there is no level difference between the structures shown in FIGS. 1 and 2. However, when the optical integrated circuit becomes large in scale, the number of connection points to optical fibers or the like increases, so that the structure for optical coupling between the optical integrated circuit and the outside of the package is complicated to cause an increase in cost. Accordingly, the protective method using the hermetic package sealing the whole of the optical integrated circuit impairs the merit of the PLC type optical integrated circuit. The large-scale integration of the optical integrated circuit can be supported by sealing the optical active element with resin or the like locally applied to the periphery of the optical active element and adopting a simple connecting method such as butt joint for optical connection points.

In the case of applying this method to the structure shown in FIG. 1, there is a problem that the sealing material such as resin may flow down along the inclined surface. In general, the sealing material such as resin has a refractive index higher than that of air. As a result, the reflectance on the inclined surface is greatly reduced by the resin flowed down along the inclined surface, so it is therefore necessary to coat the inclined surface with metal or the like. In the case of coating the inclined surface, the inclined surface must be formed at a position exposed to the outside of the optical integrated circuit as at the end thereof. Accordingly, there is a substantial limit to the forming position of the inclined mirror, causing a great disadvantage in designing the optical integrated circuit.

In the spatial reflection type structure shown in FIG. 2, a transparent resin or the like can be easily applied before mounting the optical active element, so that the above limit to the designing of the optical integrated circuit can be eliminated. Regarding a forming method for the above-mentioned spatial reflection type structure that may be advantageous in the case of considering the sealing structure for the whole of the optical integrated circuit, the following subjects are assumed. The subjects to be described later are required to satisfy the practicable performance, reliability, compactness, and cost effectiveness of the inclined mirror, and they are indispensable for the future evolution of optical active integration in the optical integrated circuit.

The first subject is a subject on a monolithic structure between the perpendicular end surface of the optical waveguide and the inclined mirror. The first-subject contributes to the reliability of the mirror structure. For example, in the case of forming the spatial reflection type structure by using separate components, there is a possibility that an adhesive material for the separate components may expand because of variations in operation temperature conditions or the like, causing a degradation in optical coupling. Such a degradation in optical coupling can be avoided by forming a monolithic structure between the perpendicular end surface and the inclined mirror.

The second object is a subject on simultaneous formation of the perpendicular end surface of the optical waveguide and the inclined mirror. In general, it is difficult to form a mask for reprocessing a wafer near a deep groove formed on the wafer for forming the inclined surface. Accordingly, it is necessary to realize a forming method by which both the formation of the perpendicular end surface and the formation of the inclined surface can be performed simultaneously.

The third subject is a subject on the perpendicularity of the light emergent end surface to the optical waveguide (which will be hereinafter referred to as end surface perpendicularity). If the end surface perpendicularity is not satisfactory, the emergent light is refracted at the end surface to cause a limit to the coupling tolerance between the end surface and the optical active element (the deviation of the mount position of the optical active element allowing a required coupling efficiency). Therefore, it is desirable to realize a forming method which can sufficiently ensure the end surface perpendicularity.

The fourth subject is a subject on the distance between the perpendicular end surface of the optical waveguide and the inclined mirror (which will be hereinafter referred to as end surface-to-inclined surface distance). If the end surface-to-inclined surface distance is large, the reflection point of a light beam on the inclined surface is largely deviated by the refraction at the light emergent end surface, causing a limit to the coupling tolerance between the end surface and the optical active element. Therefore, it is necessary to realize a forming method which can reduce the end surface-to-inclined surface distance.

The fifth subject is a subject on the smoothness of the perpendicular end surface of the optical waveguide and the reflection surface of the inclined mirror. If the smoothness of the perpendicular end surface and the reflection surface is low, a reduction in optical coupling quantity due to scattering at each surface is invited. Therefore, it is desirable to realize a forming method which can ensure sufficient smoothness.

The sixth subject is a subject on localization of the inclined mirror forming region. By localizing the inclined mirror forming region, in-line optical coupling in a multichannel optical waveguide can be obtained to increase the degree of freedom of design of an optical waveguide pattern.

In relation to the above-mentioned subjects, the conventional forming methods A to F have the following problems. The conventional forming method A does not satisfy the first subject. That is, the hybrid inclined mirror structure by this method is not a monolithic inclined structure, because the inclined mirror is fabricated as a separate component by using anisotropic etching of Si crystal or the like and this mirror component is hybrid-integrated with the optical waveguide. Further, since the separate component is used, mass production and cost reduction are difficult.

The conventional forming method B does not satisfy the sixth subject. By the method B using inclined dicing, the inclined surface region traverses a chip, so that the inclined surface region cannot be localized. According to the conventional forming method C, the fifth subject is difficult to satisfy. By the method C using a laser beam, a degradation in optical characteristics is caused by the roughness of a laser machined surface and the thermal deformation and residual stress near the laser machined surface, so that it is difficult to ensure sufficient smoothness of the inclined surface.

According to the conventional forming method D, the third subject and the fourth subject are difficult to simultaneously satisfy, because these subjects are in a trade-off relation. In the wet etching of an isotropic material such as silica, the process proceeds concentrically from an etched surface, so that the emergent end surface of the optical waveguide over which the material having a high etching rate is not deposited by evaporation comes to lie on a concentric circle formed by the underetch under the mask, so that the shape of the end surface of the optical waveguide is curved. Accordingly, in the case that the horizontal distance from the bottom of the inclined mirror to the top of the emergent end surface is equal to the thickness of a cladding layer and that a core layer is embedded in the cladding layer at its substantially central portion, the perpendicularity of the emergent end surface becomes as low as about 60°.

Conversely, in the case of ensuring the perpendicularity of the emergent end surface, the etching quantity must be increased to obtain a large etching radius, i.e., to increase the distance between the emergent end surface and the inclined mirror. For example, in the case of obtaining an angle of 80° or more for the perpendicularity of the emergent end surface, the horizontal distance from the bottom of the inclined mirror to the top of the emergent end surface must be increased to an amount about three times the thickness of the cladding layer. Thus, the subject on the end surface perpendicularity and the subject on the end surface-to-inclined surface distance are in a trade-off relation, so that it is difficult for the conventional forming method D to simultaneously satisfy these two subjects.

The conventional forming method E does not satisfy the second subject. In the forming method by inclined RIE, second RIE for the perpendicular end surface is required, so that simultaneous formation of the perpendicular end surface and the inclined surface is difficult. Further, the shape of a groove formed by the first or inclined RIE has an acute edge (reverse mesa) obtained by subtracting the angle of the inclined surface from 90°. Accordingly, in forming a mask for the second RIE in the condition where the deep groove is present, resist cutting may occur with a high probability due to the reverse mesa edge even when a resist having a low viscosity is applied by spray coating. Further, even when a resist having a high viscosity is applied by using a general spin coater, there may arise a problem that air bubbles present in the groove cannot be removed. Thus, it is very difficult to realize the simultaneous formation of the perpendicular end surface and the inclined surface.

According to the conventional forming method F, the third subject and the fifth subject are difficult to simultaneously satisfy, because these two subjects are in a trade-off relation. In the gray-scale mask, the three-dimensional shape of the inclined surface is approximated according to the average of exposure intensities at a subpixel size forming a gray scale. Accordingly, in the case that the thickness of a photoresist film is small, sufficient approximation in the direction along the film thickness (along the depth of etching). However, in the case of a thick film required for formation of the inclined surface (the film thickness being determined by the etching selective ratio between the optical waveguide material and the photomask material), the linearity between the exposure intensity and the amount of photoreaction in the direction along the depth is degraded to cause an increase in exposure time.

Accordingly, near the top of the inclined surface where the amount of exposure is desired to be reduced, the photoreaction of the photomask proceeds in the direction along the depth, so that there is a high possibility of generation of pixel-sized unevenness. To smoothen such an uneven surface, the speed of heating after exposure and development until thermal curing of the photomask material may be increased. However, in the case of increasing the heating speed in the heating process(post-baking) after development for a general photomask material, not only a deterioration of a developed pattern due to softening occurs, but also the photomask material over the perpendicular end surface is softened to cause a deterioration in perpendicularity of the mask.

Conversely, in the case of greatly decreasing the heating speed in the post-baking process, some kind of photomask material can be cured with the perpendicularity being maintained, but the smoothness of the inclined surface cannot be obtained. Thus, in the forming method by the gray mask and RIE, it is difficult to simultaneously satisfy the subject on the perpendicularity of the end surface and the subject on the smoothness of the inclined surface because of the trade-off relation therebetween. The conclusion drawn from the above discussion is that it is difficult to realize a spatial reflection type structure which can simultaneously satisfy all of the above subjects by any one of the above conventional forming methods.

SUMMARY OF THE INVENTION

It is therefore an object of the present invention to provide a manufacturing method for an optical integrated circuit having a spatial reflection type structure in which an end surface and an inclined surface can be accurately and efficiently formed in an optical waveguide layer formed on a substrate.

In accordance with an aspect of the present invention, there is provided a manufacturing method for an optical integrated circuit having a spatial reflection type structure such that light incident or reflected on a substantially perpendicular end surface of an optical waveguide layer formed on a substrate is reflected on an inclined surface opposed to the end surface, the manufacturing method including the steps of applying a first photoresist to the upper surface of the optical waveguide layer; removing the first photoresist except a portion corresponding to the inclined surface; heating the first photoresist to a given temperature to melt the first photoresist at least partially and deform the first photoresist by surface tension, thereby forming a first mask having an inclined shape; applying a second photoresist to the upper surfaces of the optical waveguide layer and the first mask; removing the second photoresist at a portion ranging from a position corresponding to the end surface to a position corresponding to the upper end of the inclined surface to form a second mask; and etching the first mask, the second mask, and the optical waveguide layer by reactive ion etching to thereby simultaneously form the end surface and the inclined surface.

Preferably, the etching step is performed in a mixed-gas atmosphere of fluorine-based gas and oxygen. By setting the flow ratio between the fluorine-based gas and the oxygen to an optimum value, the etching selective ratio between the optical waveguide layer and the first mask can be optimally controlled to thereby accurately form the inclined surface by reactive ion etching (RIE). The first photoresist removing step includes the step of exposing the first photoresist to light by using a mask having a given pattern and the step of developing an exposed portion of the first photoresist obtained by the exposing step. Preferably, the exposing step includes multistep exposure using a plurality of masks having different pattern sizes.

Preferably, the first and second masks are exposed to UV radiation after forming the second mask, whereby the first and second photoresists respectively forming the first and second masks are cured to improve the heat resistance of the first and second masks. Preferably, the wavelength of the UV radiation is in the range of about 220 nm to about 320 nm. The manufacturing method for the optical integrated circuit further includes the step of forming a metal film on the inclined surface. Either a lift-off process or an etching process may be adopted as the metal film forming step.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
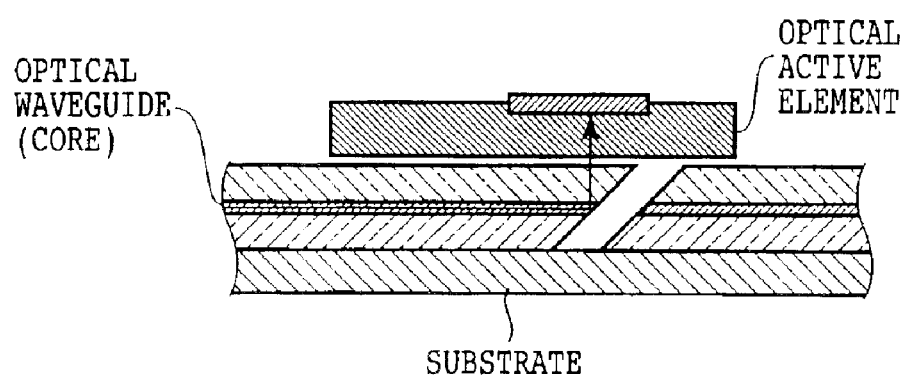
FIG. 1 is a sectional view showing a waveguide end surface reflection type optical coupling structure.
Figure 2:
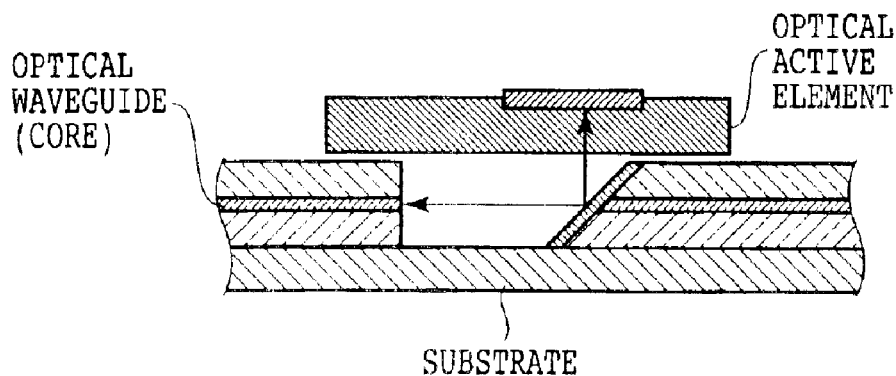
FIG. 2 is a sectional view showing a spatial reflection type optical coupling structure.
Figure 3A:
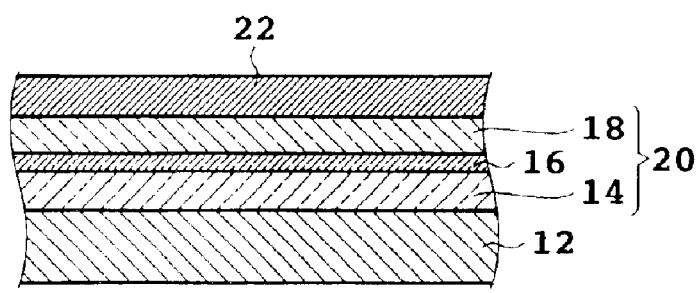
FIGS. 3A to 3H are sectional views showing a manufacturing method according to a first preferred embodiment of the present invention in the order of steps.

Some preferred embodiments of the present invention will now be described in detail with reference to the drawings. FIGS. 3A to 3H are sectional views showing a manufacturing method according to a first preferred embodiment of the present invention in the order of steps. As shown in FIG. 3A, an optical waveguide layer 20 consisting of an undercladding layer 14, a core 16, and an overcladding layer 18 is formed on a Si substrate 12. The optical waveguide layer 20 is a silica-based optical waveguide layer, which is deposited on the substrate 12 by CVD (Chemical Vapor Deposition), FHD (Flame Hydrolysis Deposition), or sputtering, for example.

Figure 3B:
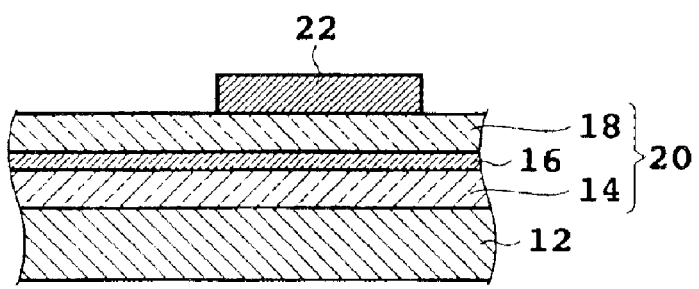

A first photoresist 22 for formation of an inclined surface is applied to the upper surface of the optical waveguide layer 20 so as to obtain a thickness of about 10 $\mu$m by the use of a spin coater. The first photoresist 22 is formed of an organic photosensitive material. For example, a positive resist OFPR-800 manufactured by Tokyo Ohka Kogyo Co., Ltd. may be adopted as the first photoresist 22. The first photoresist 22 applied by the spin coater is baked at a given temperature. Thereafter, as shown in FIG. 3B, the first photoresist 22 is patterned so as to leave a rectangular portion corresponding to the inclined surface to be formed. In other words, the first photoresist 22 is removed except the portion corresponding to the inclined surface. This patterning is performed by a photolithography technique consisting of exposure and development using a mask having a given pattern. The exposure is performed by using a G line, for example.

Figure 3C:
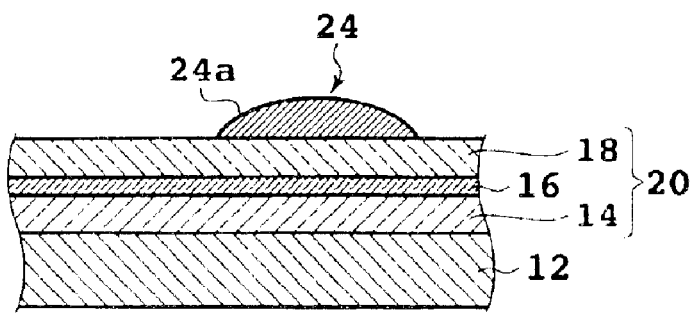

As shown in FIG. 3C, the first photoresist 22 is next heated to about 200° C. so that the first photoresist 22 is melted at least partially and is aggregated by its surface tension to thereby form a first mask 24 having a gently inclined shape 24a. The gently inclined shape 24a is substantially arcuate as viewed in cross section, and the angle formed by this arcuate surface and the upper surface of the optical waveguide layer 20 is about 10° to about 13°.

Figure 3D:
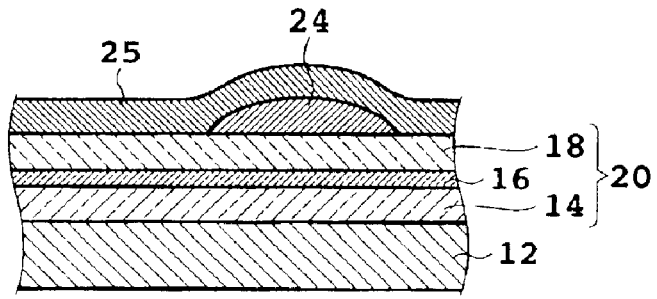

As shown in FIG. 3D, a second photoresist 25 for formation of a perpendicular end surface is next applied to the upper surfaces of the overcladding layer 18 and the first mask 24 so as to obtain a thickness of about 15 $\mu$m. The second photoresist 25 is formed of an organic photosensitive material. While the second photoresist 25 is preferably highly heat-resistant photoresist to ensure sufficient perpendicularity of the perpendicular end surface, the same photoresist as the first photoresist 22 may be used. In the case of using the same photoresist for the first and second photoresists 22 and 25, a UV irradiation process or the like to be hereinafter described is preferably performed.

Figure 3E:
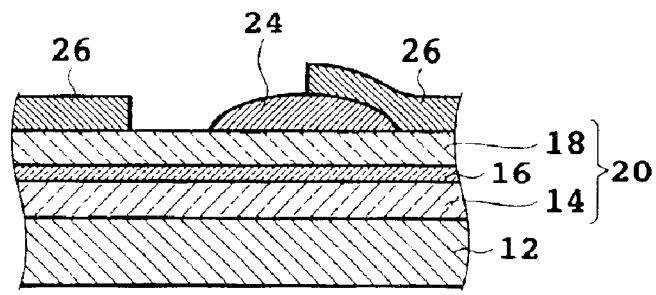

As shown in FIG. 3E, the second photoresist 25 is removed at a portion ranging from a position corresponding to the perpendicular end surface to a position corresponding to the upper end of the inclined surface by photolithography consisting of exposure and development steps using a mask having a given pattern, thereby forming a second mask 26. At this time, the first mask 24 formed from the first photoresist 22 has already been heated at a high temperature of about 200° C., so that the first mask 24 has lost its photosensitive characteristic. Accordingly, the shape of the first mask 24 hardly changes in the above exposure and development steps.

Figure 3F:
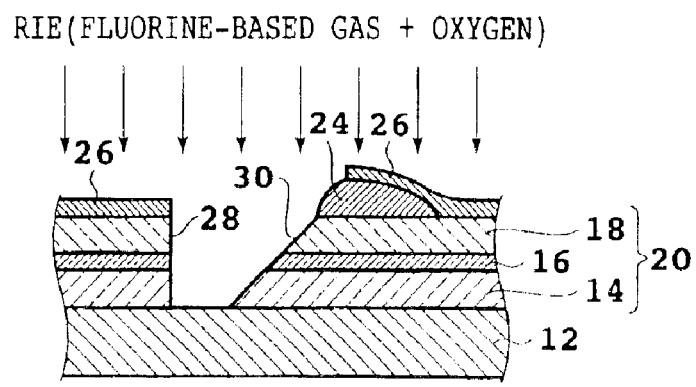

As shown in FIG. 3F, the first mask 24, the second mask 26, and the optical waveguide layer 20 are etched by reactive ion etching (RIE) using a mixed gas of fluorine-based gas (e.g., $CF_4$ or $C_4F_8$) and a small quantity of oxygen as an etching gas so as to transfer the shapes of the first and second masks 24 and 26 to the optical waveguide layer 20, thereby forming a perpendicular end surface 28 and an inclined surface 30 opposed to the perpendicular end surface 28. The silica-based optical waveguide layer 20 is etched primarily by the fluorine-based gas, and its etching rate is not so affected by the quantity of oxygen in the etching gas. To the contrary, the etching rate of the first mask 24 formed of a positive organic photoresist largely changes according to the quantity of oxygen in the etching gas (specifically, the etching rate increases with an increase in the quantity of oxygen). Accordingly, by mixing a small quantity of oxygen into the fluorine-based gas, the etching rate of the first mask 24 is controlled by the oxygen.

The quantity of oxygen to be introduced is adjusted so that the film thickness of the first mask 24 calculated according to the etching selective ratio between the silica-based optical waveguide layer 20 and the first mask 24 formed of an organic photoresist falls within a desired range. In this preferred embodiment, $C_4F_8$ gas is used as the fluorine-based gas, and the flow ratio between the $C_4F_8$ gas and the oxygen is adjusted to 18:1. By performing RIE using such an etching gas with the flow ratio between the $C_4F_8$ gas and the oxygen adjusted to the above ratio, all of the silica-based optical waveguide layer 20, the first mask 24, and the second mask 26 decrease uniformly according to the RIE time to thereby form the perpendicular end surface 28 to which the shape of the second mask 26 has been transferred and simultaneously form the inclined surface 30 to which the shape of the first mask 24 has been transferred. Further, for enhancement of the uniformity of the etching rate in RIE, the etching gas may be diluted with an inert gas such as helium (He) or argon (Ar).

Figure 3G:
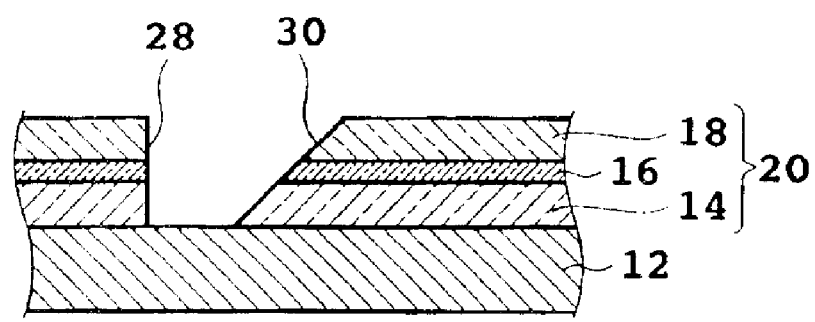

After completion of the RIE step using the first and second masks 24 and 26, the remaining first and second masks 24 and 26 are removed. This mask removal process may be performed by ashing using oxygen plasmas in the case of using an organic photoresist for the masks 24 and 26. Alternatively, the remaining masks 24 and 26 may be removed by RIE using oxygen as an etching gas. FIG. 3G shows a condition where the remaining masks 24 and 26 have been removed.

After completing the formation of the perpendicular end surface 28 and the inclined surface 30 on the optical waveguide layer 20, an inclined mirror forming mask (not shown) for forming a metal film mirror 32 on the inclined surface 30 is formed on the substrate 12 and the optical waveguide layer 20 at their required positions. This inclined mirror forming mask may be formed by applying a photoresist on the substrate 12 and the optical waveguide layer 20 and next patterning the photoresist by photolithography. In the process of forming the inclined mirror forming mask, there is a possibility that when the photoresist is applied by the use of a general spin coater, resist cutting may occur at the corners of a groove defined by the optical waveguide layer 20, the perpendicular end surface 28, and the inclined surface 30 because of a centrifugal force generated during the spin coating. To avoid such resist cutting, spray coating of the photoresist is effective, for example.

Figure 3H:
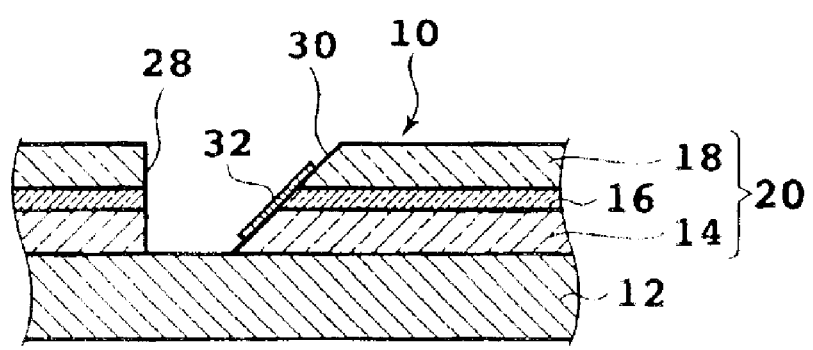

After forming the inclined mirror forming mask, the metal film mirror 32 is formed on the inclined surface 30 as shown in FIG. 3H. By this forming process for the metal film mirror 32 on the inclined surface 30, an optical integrated circuit 10 having a spatial reflection type structure can be obtained. The metal film mirror 32 may be formed by uniformly depositing a metal such as titanium (Ti), gold (Au), or nickel (Ni) by evaporation or sputtering and next lifting off the inclined mirror forming mask, for example.

Figure 4A:
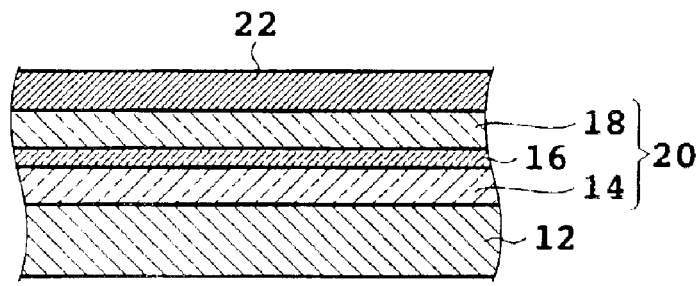
FIGS. 4A to 4C are sectional views showing a part of a manufacturing method according to a second preferred embodiment of the present invention.
Figure 4B:
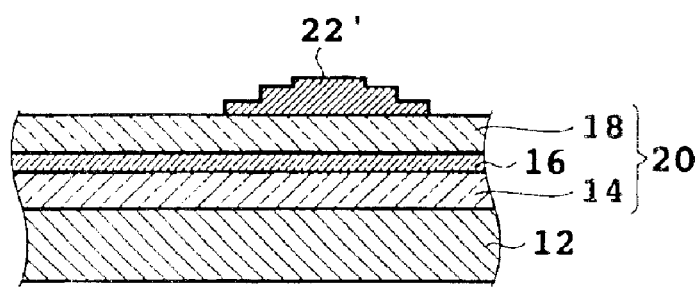
Figure 4C:
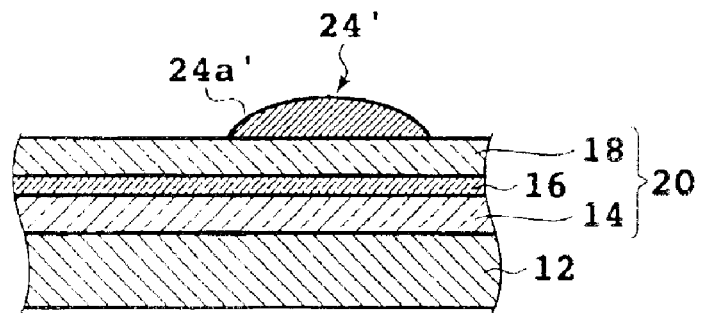

FIGS. 4A to 4C show a part of a manufacturing method according to a second preferred embodiment of the present invention. As shown in FIG. 4A, a first photoresist 22 for formation of an inclined surface is first applied to an optical waveguide layer 20 by using a spin coater. This step is similar to the step shown in FIG. 3A of the first preferred embodiment. Thereafter, the first preferred embodiment 22 is subjected to multistep exposure using a plurality of masks (e.g., three masks in this preferred embodiment) having different exposure regions (different pattern sizes), and subsequent development is carried out to leave a stepwise first photoresist pattern 22' at a position corresponding to the inclined surface to be formed later and remove the remaining first photoresist 22 (FIG. 4B).

As shown in FIG. 4C, the first photoresist pattern 22' is next heated to about 200° C. so that the first photoresist pattern 22' is melted at least partially and the stepwise surface of the first photoresist pattern 22' is smoothened to thereby form a first mask 24' having a gently inclined shape 24a'. In this manner, the first photoresist 22 is stepwise patterned to thereby obtain an effect that the gently inclined shape 24a' of the first mask 24' can be formed more easily from the first photoresist pattern 22' as compared with the rectangular photoresist pattern 22 shown in FIG. 3B to which multistep exposure is not applied. After forming the first mask 24' for formation of the inclined surface as mentioned above, the same steps as the steps shown in FIGS. 3D to 3H of the first preferred embodiment are performed.

Figure 5A:
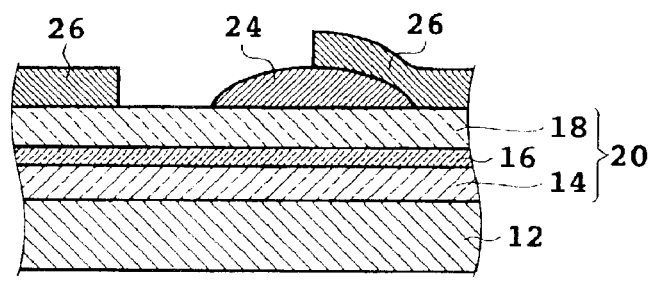
FIGS. 5A to 5C are sectional views showing a part of a manufacturing method according to a third preferred embodiment of the present invention.
Figure 5B:
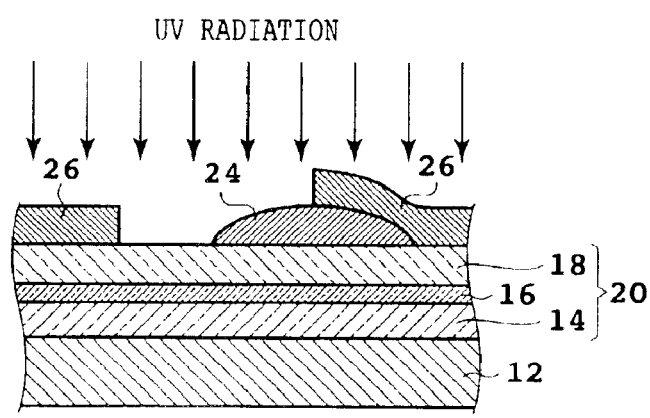
Figure 5C:
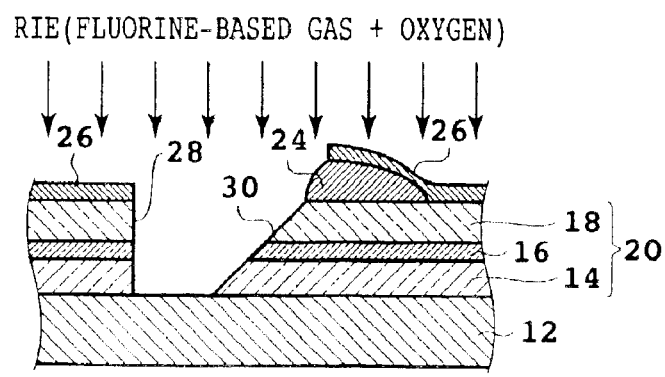

FIGS. 5A to 5C show a part of a manufacturing method according to a third preferred embodiment of the present invention. In this manufacturing method, the same steps as the steps shown in FIGS. 3A to 3E of the first preferred embodiment are performed until the masks 24 and 26 for RIE are formed. The step shown in FIG. 5A corresponds to the step shown in FIG. 3E. As shown in FIG. 5B, the whole of the first and second masks 24 and 26 is exposed to UV radiation to thereby cure the first and second photoresists 22 and 25 respectively forming the first and second masks 24 and 26.

By adding the step shown in FIG. 5B, the heat resistance of the first and second masks 24 and 26 can be improved. Accordingly, the first and second masks 24 and 26 are not deformed even when temperature rises in RIE to be performed in the next step, thereby obtaining a good perpendicular end surface 28 of the optical waveguide layer 20. In this preferred embodiment, the second photoresist 25 forming the second mask 26 can be cured by UV radiation to improve its heat resistance. Accordingly, it is preferable to use the same photoresist for the first and second photoresists 22 and 25, so as to reduce a manufacturing cost and simplify a manufacturing process.

It is especially effective to set the wavelength of the UV radiation in the range of about 220 nm to about 320 nm. In the case that a thick photoresist film having a thickness of 10μm or more as in this preferred embodiment is exposed to UV radiation, the exposure to UV radiation is preferably performed under reduced pressure, thereby allowing the suppression of foaming of the photoresist upon exposure to UV radiation. Thus, by the exposure of the photoresists 22 and 25 to UV radiation for curing, the heat resistance temperature of the first and second masks 24 and 26 can be increased to 250° C. or higher to thereby prevent thermal deformation of the first and second masks 24 and 26 even in a long-duration RIE process.

After completing the curing step for the first and second masks 24 and 26 by the exposure to UV radiation, RIE using a mixed gas of fluorine-based gas and oxygen as an etching gas is performed as shown in FIG. 5C to form a perpendicular end surface 28 and an inclined surface 30 in the optical waveguide layer 20. This step is similar to the step shown in FIG. 3F of the first preferred embodiment. The subsequent steps of this preferred embodiment are similar to the steps shown in FIGS. 3G to 3H of the first preferred embodiment.

In the case of partially removing the optical waveguide layer 20 at any positions other than the inclined mirror forming position for the purposes of obtaining a heat insulating effect, stress relieving effect, light shielding effect, etc., a groove structure may be formed on the optical waveguide layer 20 simultaneously with the inclined mirror structure by patterning the photoresist 25 for the second mask 24 and performing RIE.

While the optical waveguide layer 20 is formed of a silica-based material in each of the above preferred embodiments, any materials capable of forming an optical waveguide, such as polyimide, may be adopted as the material of the optical waveguide layer 20. Further, the Si substrate 12 may be replaced by a silica substrate having a coefficient of thermal expansion similar to that of the optical waveguide layer 20.

According to the manufacturing method for the optical integrated circuit of the present invention, a spatial reflection type structure having an optical waveguide end surface with good perpendicularity and a smooth inclined surface can be manufactured in a monolithic and localized form by a full wafer process. Accordingly, a low-cost, high-performance PLC type WDM device can be obtained.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A manufacturing method for an optical integrated circuit having a spatial reflection type structure such that light incident or reflected on a substantially perpendicular end surface of an optical waveguide layer formed on a substrate is reflected on an inclined surface opposed to said end surface, said manufacturing method comprising the steps of:

applying a first photoresist to an upper surface of said optical waveguide layer;

removing said first photoresist except a portion corresponding to said inclined surface;

heating said first photoresist to a given temperature to melt said first photoresist at least partially and deform said first photoresist by surface tension, thereby forming a first mask having an inclined shape;

applying a second photoresist to the upper surfaces of said optical waveguide layer and said first mask;

removing said second photoresist at a portion ranging from a position corresponding to said end surface to a position corresponding to the upper end of said inclined surface to form a second mask; and etching said first mask, said second mask, and said optical waveguide layer by reactive ion etching to thereby simultaneously form said end surface and said inclined surface.

2. A manufacturing method according to claim 1, wherein said etching step is performed in a mixed-gas atmosphere of fluorine-based gas and oxygen.

3. A manufacturing method according to claim 1, wherein said first photoresist and said second photoresist are the same photoresist.

4. A manufacturing method according to claim 1, wherein said first photoresist removing step comprises the step of exposing said first photoresist to light by using a mask having a given pattern and the step of developing an exposed portion of said first photoresist obtained by said exposing step.

5. A manufacturing method according to claim 4, wherein said exposing step comprises multistep exposure using a plurality of masks having different pattern sizes.

6. A manufacturing method according to claim 1, further comprising the step of exposing said first and second masks to UV radiation after forming said second mask.

7. A manufacturing method according to claim 6, wherein said UV radiation has a wavelength ranging from about 220 nm to about 320 nm.

8. A manufacturing method according to claim 1, further comprising the step of forming a metal film on said inclined surface.

9. A manufacturing method according to claim 1, wherein a pattern for forming a groove structure at a position on said substrate except said spatial reflection type structure for the purposes of obtaining a heat insulating effect, stress relieving effect, and light shielding effect is formed on said optical waveguide layer simultaneously with formation of said second mask, and both said spatial reflection type structure and said groove structure are simultaneously formed by said reactive ion etching.

* * * * *